UNITED STATES PATENT OFFICE.

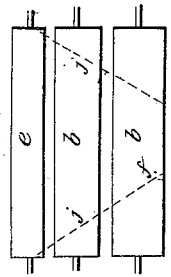
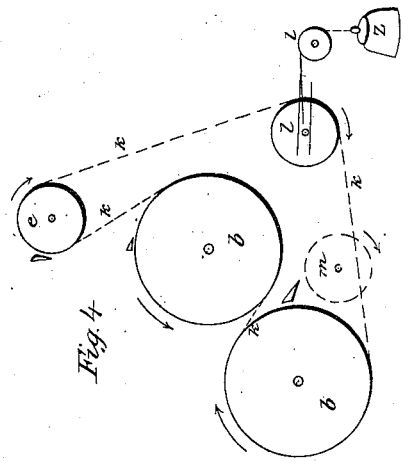
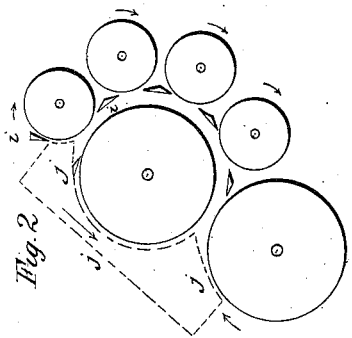
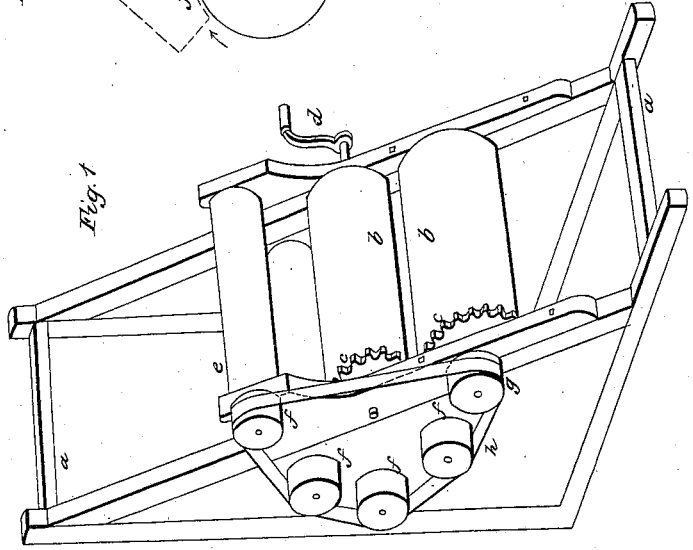
J. W. Post,
Bread Machine,
No. 1,516. Patented Mar. 14, 1840.

JOHN W. POST, OF BALTIMORE, MARYLAND.

MACHINE FOR BRAKING OR WORKING DOUGH.

Specification of Letters Patent No. 1,516, dated March 14, 1840.

*To all whom it may concern:*

Be it known that I, JOHN W. POST, of Baltimore, Maryland, have invented a new and useful Improvement in Machines for Braking or Working Dough or Paste for Baking; and I do hereby declare that the following is a full and exact description.

This machine consists of two metal cylinders, say, one foot or more in diameter and two or more feet long, resting on journals, horizontally, in a frame. They are parallel and may be on the same level; or one may be raised in a position of 45 or 90 degrees above the other. They are placed at a requisite distance apart, or so seated as that their distance asunder may be regulated. These cylinders are geared together by 2 cogwheels on the ends of the journals. They turn in together and the lump of dough is thrown on them and is carried through between them. The dough is taken up by hand and again introduced, &c. This is the usual method of braking dough with the cylinders.

Instead of lifting up the dough by hand after it has passed through between the braking cylinders, I carry the dough up by means of cylinders or rollers, or by means of rollers and belts, additional to the braking cylinders already described. These elevating rollers are placed so as partly to encircle the most elevated braking cylinder, viz., one is placed in a proper position to take the dough as it drops from the brakers, the other rollers successively continue upward around the braker till the last one comes over, or nearly over, the top of the braker, so that the dough will tumble over and be introduced again between the brakers. The requisite motion of these elevator rollers is got by means of pinions on the journals of each, gearing into the cogwheel of the main braker that assists them in elevating the dough.

To prevent the dough from passing or squeezing out between the lower braker and the elevating rollers there are placed between each two a strip called a scraper, so that the dough must pass upward. At the tops of the upper braker and the upper roller are scrapers to free the dough from them. But, all the scrapers except the one with the lower braker and the one with the upper elevating roller, may be omitted by the introduction of a broad belt around the elevating rollers; and if the belt passes around the lower braker and the upper elevating roller, all the others may be omitted by simply introducing a tightening pulley to let the belt yield when the dough passes between it and the braking cylinders. To prevent the necessity of any hand operation after the dough is carried up, there may be sideboards or pieces from the top roller reaching downward and inclining inward at the bottom where the dough enters between the brakers.

In the accompanying drawings, $a$, $a$, Figure 1 represents the frame of the machine; $b$, $b$, the two braking cylinders geared into each other by the cogwheels $c$, $c$; $d$, a winch (or place of a pulley to receive motion from the driving power); $e$, the upper elevating roller; $f$, $f$, $f$, $f$, pulleys on the ends of the series of the elevating rollers; $g$, pulley on the lower braker; $h$, belt which gears the rollers to receive their motion from the pulley $g$.

Fig. 2, is an end view of the brakers and elevating rollers; the darts show the direction of their motion. $i$, $i$, &c., are scrapers to free the dough from the brakers and rollers and guide it upward. $j$, $j$, $j$, represents side boards to keep the dough in the middle of the brakers.

Fig. 3, $b$, $b$, represents a downward view of the brakers and the upper roller $e$, and the position of the side boards $j$, $j$, $j$, (of Fig. 2).

Fig. 4, represents an end view of the brakers $b$, $b$, and the upper roller $e$; $k$, $k$, $k$, $k$, a belt by which the 3 lower rollers of Fig. 1 and their scrapers may be dispensed with; $l$, $l$, $l$, tightening pulley apparatus; $m$, the lower roller, around which the belt may pass instead of passing around the lower braker.

What I claim as my own invention, and desire to secure by Letters Patent, is—

The manner of carrying up the dough after it has passed through between the braking cylinders, by means of the elevating rollers, or by means of the rollers and belts united, to feed the braking cylinders; the whole constructed and operating in the manner and for the purpose, described and represented in the foregoing specification and drawings.

JOHN W. POST.

Witnesses:
  JAMES DURNING,
  CHAS. T. PAINE.